US010664188B2

United States Patent
Reed et al.

(10) Patent No.: US 10,664,188 B2
(45) Date of Patent: May 26, 2020

(54) DATA SET ALLOCATIONS TAKING INTO ACCOUNT POINT-IN-TIME-COPY RELATIONSHIPS

(71) Applicant: International Business Machines Corporation, Armonk, NY (US)

(72) Inventors: David C. Reed, Tucson, AZ (US);
Dash D. Miller, St. Louis Park, MN (US); Esteban Rios, Tucson, AZ (US);
Donna Weaver, Lake Mary, FL (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 16/112,668

(22) Filed: Aug. 25, 2018

(65) Prior Publication Data

US 2020/0065001 A1    Feb. 27, 2020

(51) Int. Cl.
*G06F 3/06* (2006.01)
*G06F 11/14* (2006.01)

(52) U.S. Cl.
CPC .............. *G06F 3/065* (2013.01); *G06F 3/061* (2013.01); *G06F 3/0679* (2013.01); *G06F 11/1458* (2013.01)

(58) Field of Classification Search
CPC ........ G06F 3/065; G06F 3/061; G06F 3/0679; G06F 11/1458–1469
See application file for complete search history.

(56) References Cited

U.S. PATENT DOCUMENTS

| | | | | |
|---|---|---|---|---|
| 6,434,681 B1* | 8/2002 | Armangau | .......... | G06F 11/1466 711/162 |
| 7,930,326 B2* | 4/2011 | Doucette | ............... | G06F 3/0605 707/822 |
| 8,510,524 B1* | 8/2013 | Corbett | ................... | G06F 12/00 711/162 |
| 8,806,154 B1* | 8/2014 | Gupta | ................. | G06F 11/1448 711/156 |

(Continued)

OTHER PUBLICATIONS

Alex Osuna; Patrick Marcius Medice Bisi; Sven Schaffranneck; Readbooks Paper "N Series Snapshot: A Technical Discussion"; IBM 2007 (Year: 2007).*

(Continued)

*Primary Examiner* — Khoa D Doan
(74) *Attorney, Agent, or Firm* — Nelson and Nelson; Daniel P. Nelson; Alexis V. Nelson

(57) ABSTRACT

A method for allocating new data sets while taking into account point-in-time copy relationships is disclosed. In one embodiment, such a method includes determining free space that is available in a volume. The method further determines which portions of the free space are not subject to residual point-in-time-copy relationships. In certain embodiments, these portions are represented in a modified free space mapping that identifies storage elements (e.g., tracks. groups of tracks, etc.) in the volume that make up the free space but are not subject to residual point-in-time-copy relationships. Once the portions are known, the method determines whether the portions are sufficient to accommodate the allocation of a new data set. If the portions are sufficient, the (Continued)

method allocates the new data set therein. A corresponding system and computer program product are also disclosed.

20 Claims, 6 Drawing Sheets

(56) References Cited

U.S. PATENT DOCUMENTS

| | | | |
|---|---|---|---|
| 8,909,893 B2 | 12/2014 | Reed et al. | |
| 9,430,162 B1 | 8/2016 | McBride et al. | |
| 9,454,315 B2* | 9/2016 | Dain | G06F 3/0619 |
| 9,652,163 B2* | 5/2017 | Bish | G06F 3/0619 |
| 9,690,500 B2* | 6/2017 | Dain | G06F 3/0619 |
| 9,733,862 B1* | 8/2017 | Klemm | G06F 3/0619 |
| 9,798,495 B2 | 10/2017 | McBride et al. | |
| 2004/0186968 A1* | 9/2004 | Factor | G06F 3/0613 |
| | | | 711/162 |
| 2004/0225855 A1* | 11/2004 | Branch | G06F 3/0608 |
| | | | 711/170 |
| 2006/0036655 A1* | 2/2006 | Lastovica, Jr. | G06F 16/221 |
| 2007/0094466 A1* | 4/2007 | Sharma | G06F 3/0605 |
| | | | 711/162 |
| 2007/0156957 A1* | 7/2007 | MacHardy | G06F 3/0607 |
| | | | 711/114 |
| 2008/0183960 A1* | 7/2008 | Suarez | G06F 3/0619 |
| | | | 711/112 |
| 2009/0150627 A1* | 6/2009 | Benhase | G06F 11/2082 |
| | | | 711/162 |
| 2012/0259815 A1* | 10/2012 | Olson | G06F 11/1458 |
| | | | 707/649 |
| 2012/0303918 A1* | 11/2012 | Reed | G06F 3/0608 |
| | | | 711/165 |
| 2013/0080695 A1* | 3/2013 | Beeken | G06F 3/065 |
| | | | 711/112 |
| 2013/0080704 A1* | 3/2013 | Brown | G06F 3/0608 |
| | | | 711/118 |
| 2015/0186402 A1* | 7/2015 | Baldwin | G06F 16/1724 |
| | | | 707/693 |
| 2015/0286423 A1* | 10/2015 | Akirav | G06F 3/0619 |
| | | | 711/103 |
| 2015/0286424 A1* | 10/2015 | Dain | G06F 3/0619 |
| | | | 711/103 |
| 2015/0286430 A1* | 10/2015 | Dain | G06F 11/14 |
| | | | 711/103 |
| 2015/0286431 A1* | 10/2015 | Dain | G06F 11/14 |
| | | | 711/103 |
| 2015/0286433 A1* | 10/2015 | Dain | G06F 3/0619 |
| | | | 711/103 |
| 2015/0286540 A1* | 10/2015 | Dain | G06F 11/1469 |
| | | | 711/103 |
| 2015/0286541 A1* | 10/2015 | Dain | G06F 11/1469 |
| | | | 711/103 |
| 2015/0286542 A1* | 10/2015 | Dain | G06F 11/1448 |
| | | | 711/103 |
| 2016/0139834 A1* | 5/2016 | Hanson | H04L 67/30 |
| | | | 711/114 |
| 2016/0224278 A1* | 8/2016 | Gensler, Jr. | G06F 3/0659 |
| 2017/0003895 A1* | 1/2017 | Hatfield | G06F 11/14 |
| 2017/0206020 A1* | 7/2017 | Brown | G06F 3/0608 |

OTHER PUBLICATIONS

"DFSMSdss Storage Administration," IBM, Dec. 2017.
Paulin, "IBM Storage Virtualization—Cloud Enabling Technology," IBM, 11th TF-Storage Meeting, Sep. 26-27, 2012, Dubrovnik, Croatia, Sep. 2012.
Burns, et al., "IBM Real-time Compression in IBM SAN Volume Controller and IBM Storwize V7000," IBM Redbooks, Mar. 2015.
IP.com, "A Method and System for Implementing a Space Efficient Copy," Disclosed Anonymously, IP.com No. PCOM000216790D, Apr. 20, 2012.
IP.com, "Method for Enhanced Application performance during FlashCopy restore in multi-tier storage environment," Disclosed Anonymously, IP.com No. IPCOM000251706D, Nov. 28, 2017.

* cited by examiner

DATA SET ALLOCATIONS TAKING INTO ACCOUNT POINT-IN-TIME-COPY RELATIONSHIPS

BACKGROUND

Field of the Invention

This invention relates to systems and methods for allocating new data sets in a way that takes into account point-in-time copy relationships.

Background of the Invention

Data replication functions such as IBM's FlashCopy® may be used to generate nearly instantaneous point-in-time copies of logical volumes or data sets. Among other uses, these point-in-time copies may be used for disaster recovery and business continuity purposes. IBM's FlashCopy® in particular creates a point-in-time copy by establishing a mapping relationship between a source volume and a target volume. Once this mapping relationship is established, data may be read from either the source volume or target volume even before all data in the source volume has been copied to the target volume. In certain cases, a background copy process may be enabled to copy data from the source volume to the target volume. A target bit map associated with the target volume may keep track of which data tracks have actually been copied from the source volume to the target volume.

Today, users may prefer or require use of IBM's FlashCopy® to perform copy operations to improve I/O performance while the copy is taking place. In an active environment where a significant amount of data is moving from one place to another using FlashCopy® point-in-time copies, many FlashCopy® relationships may be established in association with a volume or particular storage elements within the volume. When a new data set is allocated on a volume, there may be old FlashCopy® relationships that are still completing or winding down, even for data sets that have already been deleted and storage space released. The tracks associated with these deleted data sets may be available for new data set allocations, but not available for use as FlashCopy® targets for a period of time. This may prevent a new FlashCopy® relationship from being established because the target of an existing FlashCopy® relationship cannot be the target of a new FlashCopy® relationship.

In view of the foregoing, what are needed are systems and methods to prevent new data sets from being allocated in storage space, that although technically free and available for use, may still be the target of point-in-time copy relationships.

SUMMARY

The invention has been developed in response to the present state of the art and, in particular, in response to the problems and needs in the art that have not yet been fully solved by currently available systems and methods. Accordingly, systems and methods are disclosed to allocate new data sets in a way that takes into account existing point-in-time copy relationships. The features and advantages of the invention will become more fully apparent from the following description and appended claims, or may be learned by practice of the invention as set forth hereinafter.

Consistent with the foregoing, a method for allocating new data sets while taking into account point-in-time copy relationships is disclosed. In one embodiment, such a method includes determining free space that is available in a volume. The method further determines which portions of the free space are not subject to residual point-in-time-copy relationships. In certain embodiments, these portions are represented in a modified free space mapping that identifies storage elements (e.g., tracks, groups of tracks, etc.) in the volume that make up the free space but are not subject to residual point-in-time-copy relationships. Once the portions are known, the method determines whether the portions are sufficient to accommodate the allocation of a new data set. If the portions are sufficient, the method allocates the new data set therein.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
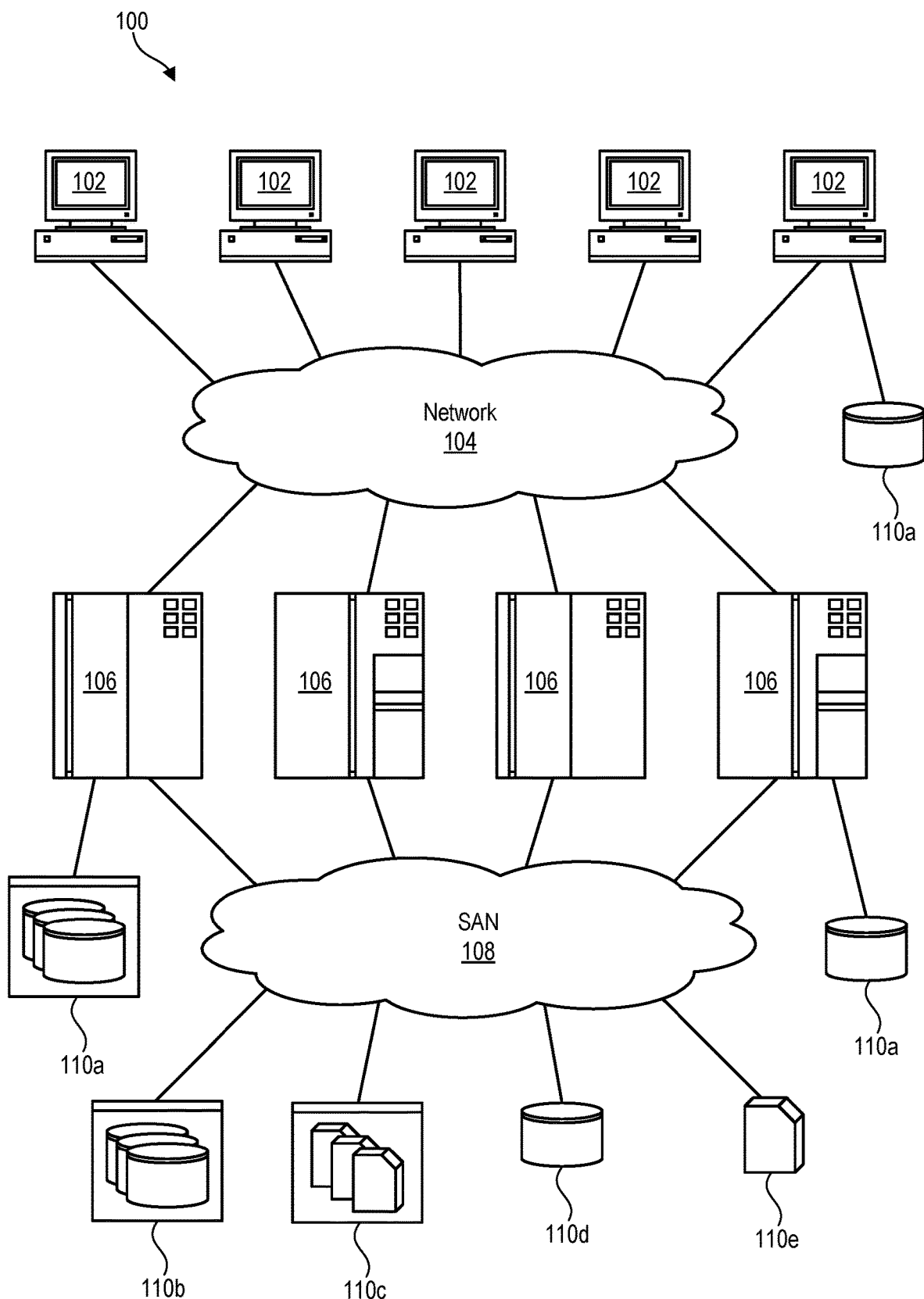
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 110*a* (e.g., arrays of hard-disk drives, solid-state drives, tape drives, etc.). These computers 102, 106 and direct-attached storage systems 110*a* may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, virtual tape systems, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
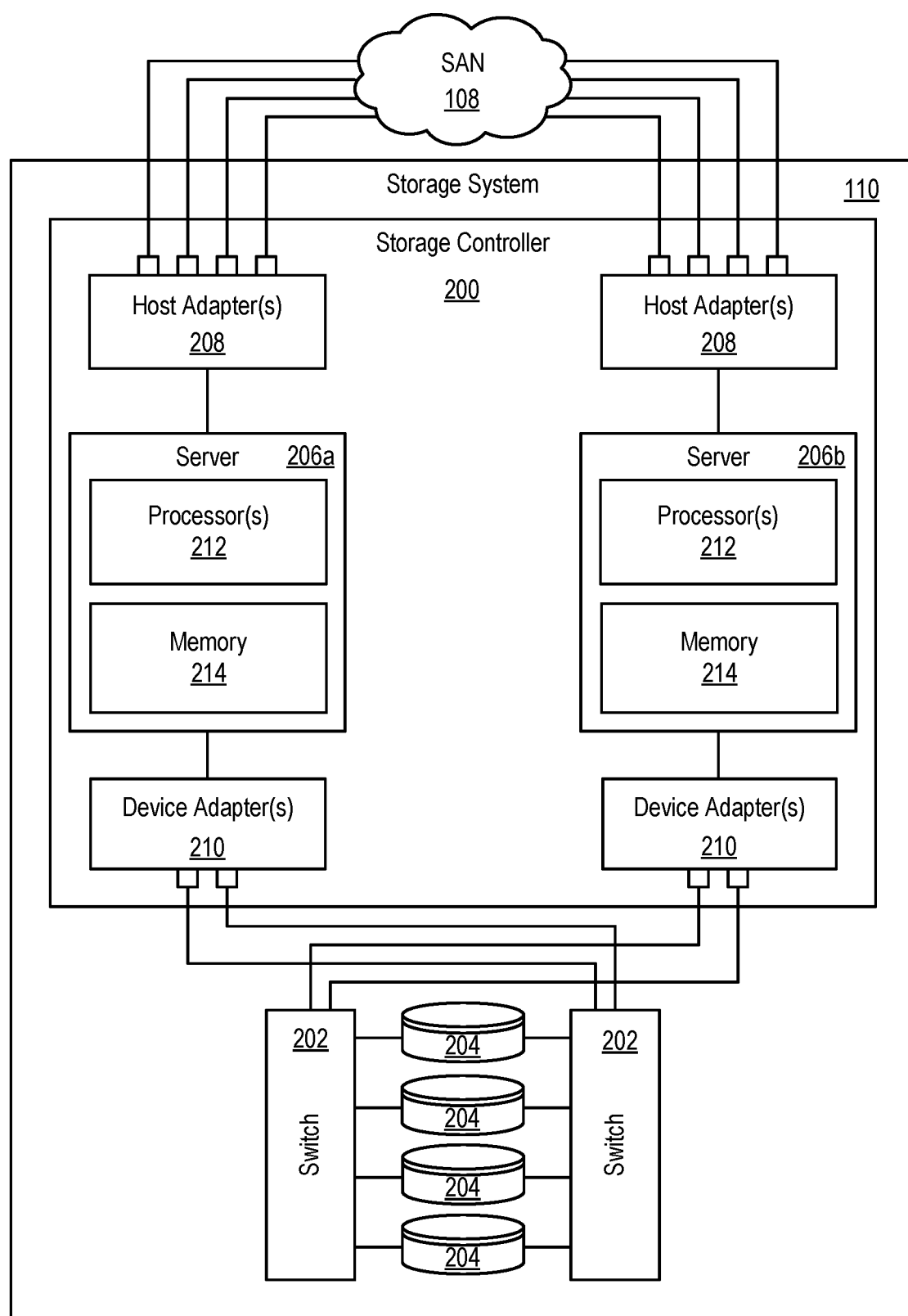
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
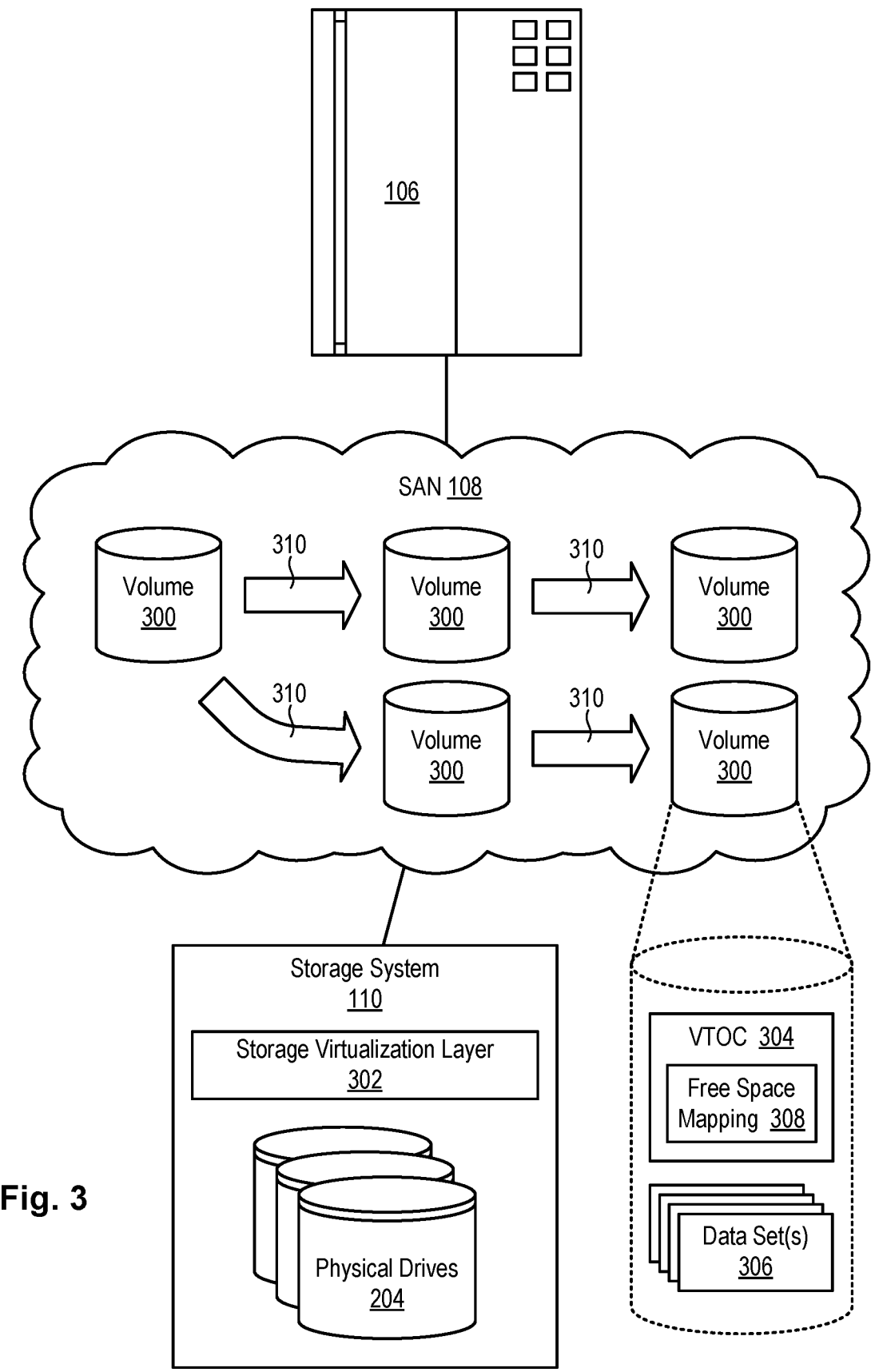
FIG. 3 is a high-level block diagram showing point-in-time-copy relationships between volumes and functionality for tracking free space within the volumes.

Referring to FIG. 3, in certain embodiments, a storage system 110 such as that illustrated in FIG. 2 may be configured to present or expose one or more volumes 300 to a host system 106. The volumes 300 may be logical volumes 300, meaning that the volumes 300 may appear to be physical drives 204 (e.g., hard drives, solid state drives, etc.) to a host system 106 but do not necessarily directly correlate to physical drives 204 on the storage system 110. For example, in certain embodiments, a physical drive 204 may be used by more than one logical volume 300 or a logical volume 300 may span all or part of multiple physical drives 204. A storage virtualization layer 302 within the storage system 110 may expose the logical volumes 300 and handle mapping between the logical volumes 300 and the physical drives 204.

As further shown in FIG. 3, in certain embodiments, each logical volume 300 may store a volume table of contents (VTOC) 304 and one or more data sets 306. A VTOC 304 may contain information for locating data sets 306 on the associated logical volume 300. In certain embodiments, the VTOC 304 is located at the beginning of the logical volume 300 and may list the names of each data set 306 on the logical volume 300 as well as the data set's size, location, and permissions. The VTOC 304 may also include a free space mapping 308 that identifies storage elements (e.g., tracks, groups of tracks, etc.) within the volume 300 that are free and available to store data. The VTOC 304 is typically created at the time the logical volume 300 is initialized.

As further shown in FIG. 3, in certain embodiments, point-in-time-copy relationships 310, such as FlashCopy® relationships 310, may be established between the volumes 300 on the storage system 110. Such point-in-time-copy relationships 310 may be established between a source volume 300 and a target volume 300. Once this mapping relationship is established, data may be read from either the source volume 300 or target volume 300 even before all data in the source volume 300 has been copied to the target volume 300. In certain cases, a background copy process may be enabled to copy data from the source volume 300 to the target volume 300.

In an active environment where a significant amount of data is being moved from one place to another using point-in-time copies, many point-in-time-copy relationships 310 may be established between the volumes 300 or for particular storage elements or data sets 306 within the volumes 300. When a new data set is allocated on a volume 300, there may be old point-in-time-copy relationships 310 that are still completing or winding down, even for data sets 306 that have already been deleted and whose storage space has been freed in the free space mapping 308. The storage elements associated with these deleted data sets 306 may be available for new data set allocations, but not available for use as point-in-time-copy targets for a period of time. This may prevent a new point-in-time-copy relationship 310 from being established because the target of an existing point-in-time-copy relationship 310 cannot be the target of a new point-in-time-copy relationship 310.

Figure 4:
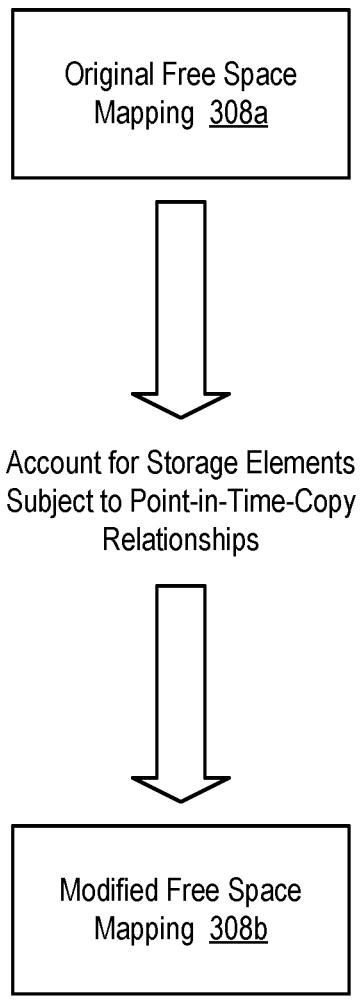
FIG. 4 is a process flow diagram showing creation of a modified free space mapping that identifies storage elements in a volume that contribute to its free space but are not subject to residual point-in-time-copy relationships.

Referring to FIG. 4, in order address the issues set forth above, systems and methods in accordance with the invention may allocate new data sets 306 in a way that takes into account point-in-time-copy relationships 310. More specifically, such systems and methods may attempt to allocate new data sets 306 in storage areas that are not subject to residual point-in-time-copy relationships 310, or at least attempt to avoid storage areas that are subject to residual point-in-time-copy relationships 310. In order to implement this functionality, systems and methods in accordance with the invention may be configured to gather information regarding which storage elements in a volume 300 are free and no longer the target of point-in-time-copy relationships 310.

In certain embodiments, systems and methods in accordance with the invention may ascertain the above-described information by making a copy of an original free space mapping 308a associated with a volume 300. This free space mapping 308 may indicate which storage elements in the volume 300 are technically "free" and available for use. The systems and methods may then query the volume 300 to determine which storage elements in the volume 300 are the target of point-in-time-copy relationships 310. Any storage elements that are the target of existing point-in-time-copy relationships 310 may be accounted for to produce a modified free space mapping 308b. This modified free space mapping 308b may indicate which storage elements in the volume 300 are free and not the subject of existing point-in-time-copy relationships 310. New data sets 306 may be allocated in these storage elements. These new data sets 306 may be used as the target of new point-in-time-copy relationships 310 since the storage space occupied by these new data sets 306 is not the target of any existing point-in-time-copy relationships 310.

Figure 5:
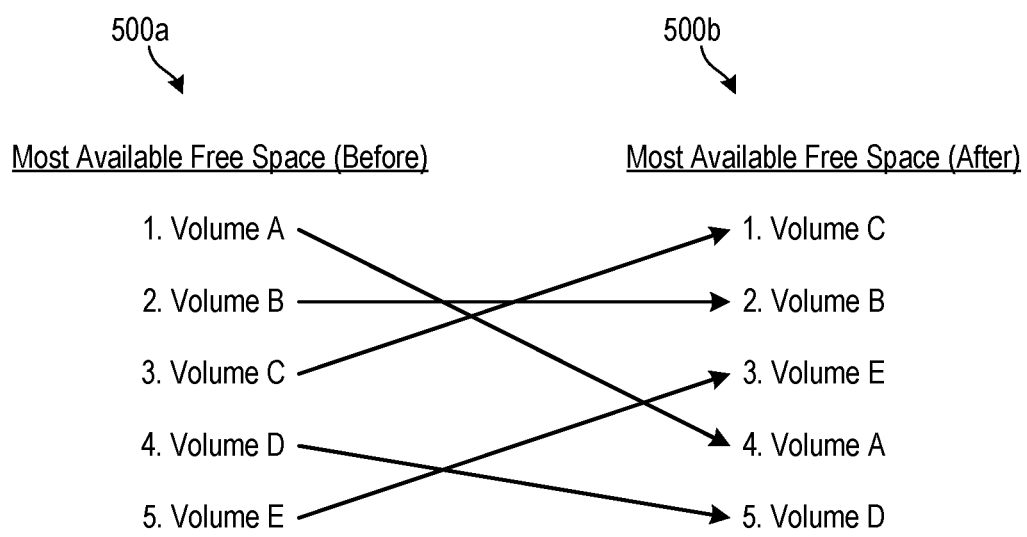
FIG. 5 is a diagram showing lists of volumes with the most available free space both before and after residual point-in-time-copy relationships are taken into account.

Referring to FIG. 5, in certain embodiments in accordance with the invention, when a request is received to allocate a new data set 306 on a storage system 110 such as that illustrated in FIG. 2, a list 500a of volumes 300 having the most available free space may be created. In certain embodiments, this list 500a may be created by analyzing a free space mapping 308 for each volume 300. Point-in-time-copy relationships 310 may then be determined for each volume 300 in the list 500a. Using this information, a modified free space mapping 308b may be created for each volume 300 in the list 500a. This modified free space mapping 308b may identify storage elements in the associated volume 300 that are free and not the target of any point-in-time-copy relationships 310. Once the modified free space mappings 308b are created and/or the point-in-time-copy relationships 310 are known, the volumes 300 in the list 500a may be re-sorted to yield a modified list 500b of volumes 300. The volumes 300 may be sorted in order of most available free space not subject to point-in-time-copy relationships 310. When a new data set 306 is allocated, systems and methods in accordance with the invention may work there way down the list 500b until a volume 300 is found with enough available free space and satisfying any additional requirements (e.g., fragmenation, etc.) to accommodate the new data set 306.

Figure 6:
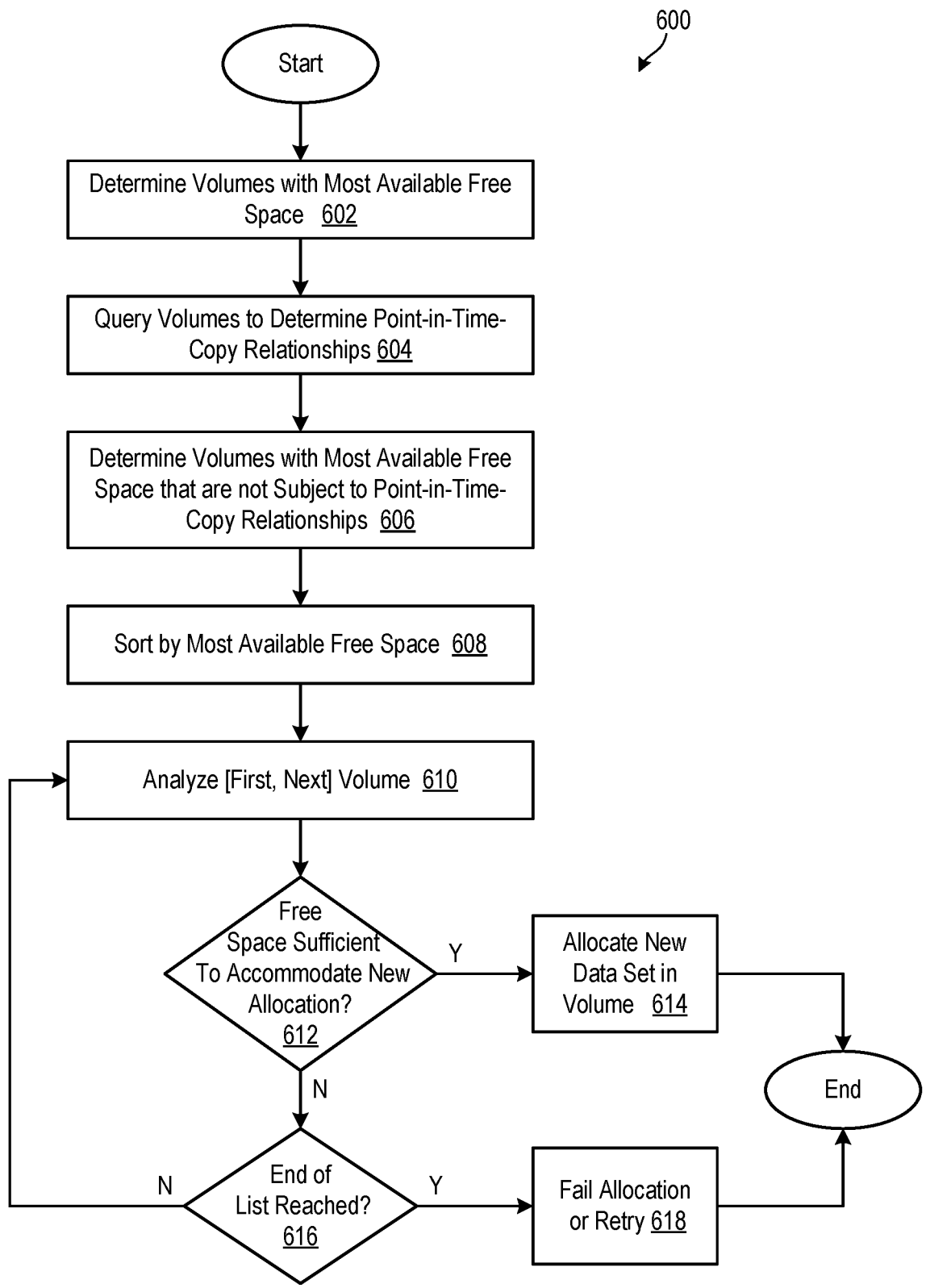
FIG. 6 is a process flow diagram showing a method for allocating a new data set that takes into account residual point-in-time-copy relationships.

FIG. 6 shows one embodiment of a method 600 for allocating a new data set 306 that takes into account residual point-in-time-copy relationships. This method 600 is presented by way of example and not limitation. As shown, when attempting to allocate a new data set 306, the method 600 determines 602 which volumes 300 that are candidates for the allocation have the most availabe free space. This may be accomplished by analyzing free space mappings 308 associated with the volumes 300 as previously discussed herein. The method 600 also queries 604 the volumes 300 to determine their point-in-time-copy relationships 310. Using this information, the method 600 determines 606 which volumes 300 have the most available free space that is not subject to existing point-in-time-copy relationships 310. In certain embodiments, this may be accomplished by creating and analyzing modified free space mappings 308b for each volume 300 as previously discussed herein.

Once the amount of free space that is not subject to point-in-time-copy relationships 310 is known for each volume 300, the method 600 sorts 608 the volumes 300 using this criteria in a list 500b. The method 600 then analyzes 610 the first volume 300 in this list 500b. If, at step 612, the volume 300 analyzed has sufficient free space to accommodate the new data set 306, the method 600 allocates 614 the new data set 306 in the volume 300 and the method 600 ends.

If, on the other hand, the volume 300 cannot accommodate the new data set 306 (e.g., the volume 300 does not have enough free space that is not subject to point-in-time-copy relationships 310, the free space in the volume 300 is too fragmented to accommodate the new data set 306, or the like), then the method 600 may refrain from allocating the new data set 306 in the volume 300. The method 600 may then determine 616 whether the end of the list 500b has been reached. If not, the method 600 analyzes 610 the next volume 300 in the list 500b.

The analysis 612 repeats for each volume 300 in the list 500b until a volume 300 is found that can accomodate the new data set 306 or the end of the list 500b is reached. If the end of the list 500b is reached without having allocated the new data set 306, the method 600 may fail 618 the allocation request associated with the new data set 306. Alternatively, the method 600 may retry 618 the allocation request by restarting the method 600 from the top. In such a scenario, the modified free space mappings 308b may be recalculated since free space in the volumes 300 may have changed and/or some point-in-time-copy relationships 310 may have terminated since the last time the volumes 300 were evaluated. In certain embodiments, the allocation request may be retried a certain number of times before the method 600 fails 618 the allocation request.

In other embodiments, if an allocation request associated with a new data set 306 fails, the allocation request may be retried without regard to whether free space in the volumes 300 is subject to residual point-in-time-copy relationships. This may allow the allocation request to succeed as opposed to fail. Thus, allocating the new data set 306 in free space not subject to point-in-time-copy relationships 310 may, in certain embodiments, be preferred but not required. In other embodiments, allocating the new data set 306 in free space that is not subject to point-in-time-copy relationships 310 is required. Where this is not possible, the method 600 may fail the allocation request. In certain embodiments, systems and methods in accordance with the invention may enable a user to establish, by configuration settings or other means, whether allocating a new data set 306 in free space that is not subject to point-in-time-copy relationships 310 is preferred or, alternatively, required.

The systems and methods disclosed herein have been primarily directed to reducing available free space to free space that is not subject to existing point-in-time-copy relationships 310. However, systems and methods in accordance with the invention are not limited to this criteria. Other criteria may be used, for example, to reduce free space beyond what is represented in a free space mapping 308. Thus, systems and methods in accordance with the invention may, for various reasons other than just allocating a new data set 306, reduce a pool of available free space to less than what is represented in a free space mapping 308 associated with a volume 300. In other words, other criteria or conditions may warrant using or preferring use of certain free space represented in a free space mapping 308 over other free space represented in the same free space mapping 308.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for allocating new data sets while taking into account point-in-time copy relationships, the method comprising:
   analyzing a free space mapping associated with a volume to determine free space that is available in the volume;
   determining which portions of the free space are not subject to residual point-in-time-copy relationships;
   using the free space mapping and the determined portions to generate a modified free space mapping that identifies storage elements in the volume that make up the free space and are not subject to the residual point-in-time-copy relationships;
   determining whether the storage elements are sufficient to accommodate an allocation of a new data set; and
   if the storage elements are sufficient, allocating the new data set in the storage elements.

2. The method of claim 1, wherein the free space mapping is retrieved from a volume table of contents (VTOC) associated with the volume.

3. The method of claim 1, wherein the free space mapping identifies storage elements in the volume that make up the free space.

4. The method of claim 1, wherein the storage elements are one of tracks and groups of tracks.

5. The method of claim 1, wherein determining whether the storage elements are sufficient to accommodate the allocation comprises comparing the allocation to the modified free space mapping.

6. The method of claim 1, if the storage elements are not sufficient to accommodate the allocation, repeating the method for additional volumes until a volume is found that can accommodate the allocation of the new data set.

7. The method of claim 6, in the event no volume can be found that can accommodate the allocation of the new data set, allocating the new data set in a volume without regard to whether its free space is subject to residual point-in-time-copy relationships.

8. A computer program product for allocating new data sets while taking into account point-in-time copy relationships, the computer program product comprising a non-transitory computer-readable storage medium having computer-usable program code embodied therein, the computer-usable program code configured to perform the following when executed by at least one processor:
   analyze a free space mapping associated with a volume to determine free space that is available in the volume;
   determine which portions of the free space are not subject to residual point-in-time-copy relationships;
   use the free space mapping and the determined portions to generate a modified free space mapping that identifies storage elements in the volume that make up the free space and are not subject to the residual point-in-time-copy relationships;
   determine whether the storage elements are sufficient to accommodate an allocation of a new data set; and
   if the storage elements are sufficient, allocate the new data set in the storage elements.

9. The computer program product of claim 8, wherein the free space mapping is retrieved from a volume table of contents (VTOC) associated with the volume.

10. The computer program product of claim 8, wherein the free space mapping identifies storage elements in the volume that make up the free space.

11. The computer program product of claim 8, wherein the storage elements are one of tracks and groups of tracks.

12. The computer program product of claim 8, wherein determining whether the storage elements are sufficient to accommodate the allocation comprises comparing the allocation to the modified free space mapping.

13. The computer program product of claim 8, wherein the computer-usable program code is further configured to, if the storage elements are not sufficient to accommodate the allocation, analyze additional volumes until a volume is found that can accommodate the allocation of the new data set.

14. The computer program product of claim 13, wherein the computer-usable program code is further configured to, in the event no volume can be found that can accommodate the allocation of the new data set, allocate the new data set in a volume without regard to whether its free space is subject to residual point-in-time-copy relationships.

15. A system for allocating new data sets while taking into account point-in-time copy relationships, the system comprising:
   at least one processor;
   at least one memory device operably coupled to the at least one processor and storing instructions for execution on the at least one processor, the instructions causing the at least one processor to:
   analyze a free space mapping associated with a volume to determine free space that is available in the volume;
   determine which portions of the free space are not subject to residual point-in-time-copy relationships;
   use the free space mapping and the determined portions to generate a modified free space mapping that identifies storage elements in the volume that make up the free space and are not subject to the residual point-in-time-copy relationships;
   determine whether the storage elements are sufficient to accommodate an allocation of a new data set; and
   if the storage elements are sufficient, allocate the new data set in the storage elements.

16. The system of claim 15, wherein the free space mapping is retrieved from a volume table of contents (VTOC) associated with the volume.

17. The system of claim 15, wherein the free space mapping identifies storage elements in the volume that make up the free space.

18. The system of claim 15, wherein the storage elements are one of tracks and groups of tracks.

19. The system of claim 15, wherein determining whether the storage elements are sufficient to accommodate the allocation comprises comparing the allocation to the modified free space mapping.

20. The system of claim 15, wherein the instructions further cause the at least one processor to, if the storage elements are not sufficient to accommodate the allocation, analyze additional volumes until a volume is found that can accommodate the allocation of the new data set.

* * * * *